United States Patent [19]

Horie et al.

[11] Patent Number: 4,633,336
[45] Date of Patent: Dec. 30, 1986

[54] MAGNETIC RECORDING APPARATUS

[75] Inventors: Tsuneo Horie, Odawara; Shoji Ozaki, Ohi; Takikazu Takeuchi, Odawara, all of Japan

[73] Assignee: Hitachi, Ltd., Tokyo, Japan

[21] Appl. No.: 648,490

[22] Filed: Sep. 10, 1984

[30] Foreign Application Priority Data

Sep. 19, 1983 [JP] Japan .................. 58-171127

[51] Int. Cl.[4] .................................. G11B 5/09
[52] U.S. Cl. ............................. 360/45; 360/51
[58] Field of Search .............. 360/45, 46, 65, 51

[56] References Cited

U.S. PATENT DOCUMENTS

3,879,342  4/1975  Patel ............................. 360/45
4,244,008  1/1981  Holt .............................. 360/65
4,306,257 12/1981  Harman ......................... 360/65
4,525,753  6/1985  Shimeki et al. ................ 360/45

Primary Examiner—Vincent P. Canney
Attorney, Agent, or Firm—Beall Law Offices

[57] ABSTRACT

A magnetic recording apparatus having a plurality of magnetic heads (111-118) by which data is written on and read from a magnetic medium (121-123) has a timing correction unit (3) that controls a suitable timing according to a predetermined characteristic of a selected magnetic head or disk apparatus and the density of logical ONE states in the data so that the data will be written on the magnetic medium under the timing controlled by the timing correction unit. Timing correction may also be provided according to whether the head is an inner or an outer head.

46 Claims, 9 Drawing Figures

MAGNETIC RECORDING APPARATUS

BACKGROUND OF THE INVENTION

The present invention relates to a magnetic recording apparatus, and more particularly to the compensation of a phase shift of a reproduced pattern in a magnetic recording apparatus having one or more magnetic heads.

It is known that magnetic recording apparatus such as magnetic disk apparatus and magnetic tape apparatus suffer from the problem of a pattern peak shift in which the position of reverse magnetization of digital data recorded on a magnetic recording medium is shifted in the direction which the interval of reverse magnetization is made longer.

The pattern peak shift is greatly dependent on a data pattern written in the magnetic recording media. To cope with this, there has been known a so-called write compensation method for effecting timing correction at the time of writing data having a large peak shift on a magnetic recording medium.

However, the conventional write compensation method is not effective in completely eliminating pattern peak shifts. As the recording density of recent magnetic recording apparatus becomes higher and higher, the width of a separate window of data tends to be smaller. Therefore, the peak shift causes a reduction in a positional margin.

SUMMARY OF THE INVENTION

For example, the magnetic disk apparatus generally have a plurality of magnetic disk media and a plurality of magneitc heads for recording the digital data on and reproducing the digital data from the media. The pattern peak shift in the magnetic disk apparatus is mainly cuased by variations in frequency characteristics of the magnetic heads of the magnetic disk media and also air gaps by which the magnetic heads are raised from the medium.

The magnetic heads have slightly different frequency characteristics due to the manufacturing processes. Even though the same data items recorded on the magnetic disk media are read out by the same magnetic heads that recorded them, the peak shifts of the reproduced patterns vary from head to head.

Accordingly, it is an object of the present invention to provide a magnetic recording apparatus capable of compensating for a phase shift due to a pattern peak shift for improving a phase margin.

Another object of the present invention is to provide a magnetic recording apparatus having a plurality of recording and reproducing heads, and capable of compensating for a pattern peak shift for each recording and reproducing head even through there are variations in the frequency characteristics of the heads.

The present invention can be incorporated in ordinary magnetic recording apparatus, but should preferably be incorporated in magnetic disk apparatus having a plurality of magnetic recording media and a plurality of magnetic heads as transducers for recording information on and reproducing information from the magnetic recording media. Different addresses are assigned respectively to the magnetic heads for selecting only one of the magnetic heads at a time and recording information on and reproducing information from a magnetic disk medium through the selected magnetic head.

The magnetic disk apparatus has a data supplying means such as a shift register for temporarily storing digital data to be written on the magnetic disk medum, and a read/write circuit for writing the data from the data supplying means on the magnetic disk medium through the selected magnetic head or for reading data recorded on the magnetic disk medium through the selected head.

To compensate for a peak shift, there is provided a timing correction circuit for correcting writing timing according to a write compensation process when the data from the data supplying means is to be written on the magnetic disk medium. The writing timing is corrected according to a characteristic of each magnetic head. It is provided a setting means in order to set previously a necessity for timing correction corresponding to the characteristic of each magnetic head and to provide a signal indicating the characteristic. The timing correction circuit corrects the timing according to the signal from the setting means. The peak shift can be compensated for each magnetic head since a preferred timing can be selected for each magnetic head taking into account different frequency characteristics of the magnetic heads.

In addition, the pattern peak shift is deeply dependent on the density of logical ONE states in the data to be writetn on the magnetic disk medium. According to the present invention, the timing can be corrected according to the density of logical ONE states in the data and the characteristic of each magnetic head.

The above and other objects, features and advantages of the present invention will become more apparent from the following description when taking in conjunction with the accompanying drawings in which preferred embodiments of the present invention are shown by way of illustrative example.

DESCRIPTION OF THE PREFERRED EMBODIMENTS

Figure 1:
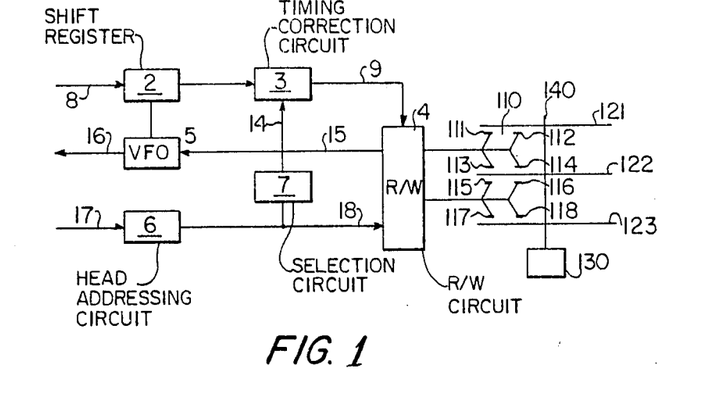
FIG. 1 is a block diagram of a magnetic disk apparatus according to an embodiment of the present invention.

FIG. 1 shows in block form a magnetic disk apparatus, particularly a control section thereof.

In FIG. 1, a motor 130 has a rotatable shaft or spindle 140 to which a plurality of magnetic disk media such as hard disks 121, 122, 123 are secured. The magnetic disk media 121, 122, 123 are capable of recording data items on both surfaces thereof. A group of magnetic heads 110 are mounted in the magnetic disk apparatus for recording data items on and reproducing recorded data items from the magnetic disk media 121, 122, 123. Magnetic heads 111, 112, 113, 114 are mounted on a first arm and magnetic heads 115, 116, 117, 118 are mounted on a second arm such that two magnetic heads are disposed in confronting relation to one surface of the magnetic disk medium. The first and second arms are movable toward the centers of the disk media 121, 122, 123 for recording data in or reproducing data from tracks selected on the disk media. The disk construction and the magnetic head access mechanism, as shown and described above, are well known in the art and will not be described in detail.

Data items to be recorded on the magnetic disk media are normally generated by a data processing unit. The data is transferred in a bit serial manner as a write input signal 8 and temporarily stored in a shift register 2. A timing correction circuit 3 effects timing correction on the input write data signal 8 stored in the shift register 2 to convert the input write data signal 8 into a corrected write data signal 9. The timing correction is performed to compensate for a pattern shift for each of the magnetic heads in particular. The shift register 2 and the timing correction circuit 3 will later be described in detail with reference to FIG. 3.

A read/write circuit 4 is responsive to a head selection signal 18 (described later) for driving a selected magnetic head to record corrected write data signal 8 on or read recorded data from the disk medium. The data 15 read by the read/write circuit 4 from the disk medium through the magnetic head group 110 is synchronized in phase by a phase synchronizing circuit such as variable frequency oscillator 5, data bits "1", "0" of the data are discriminated, and the data 15 is fed as bit serial data 16 to a host system such as a data processor or a control unit.

Figure 2:
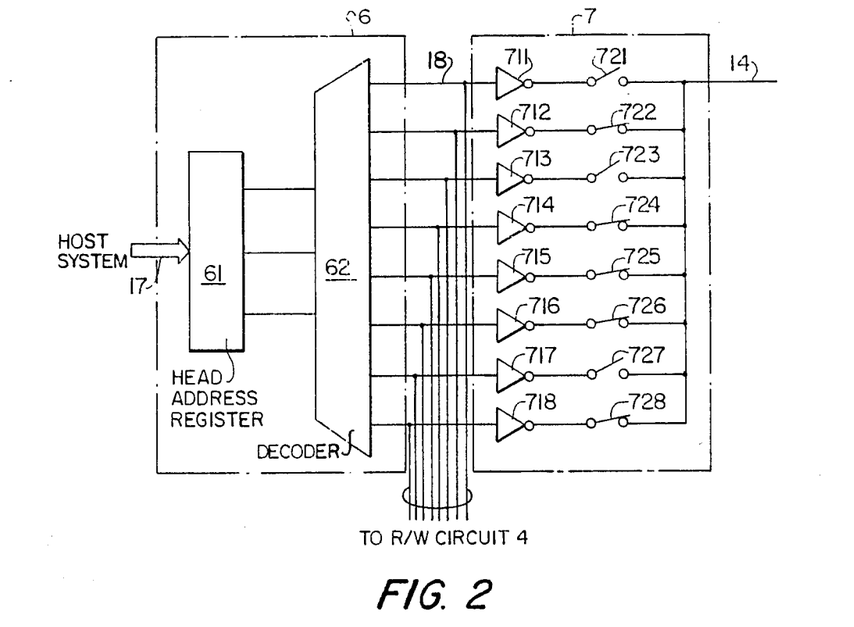
FIG. 2 is a diagram showing in detail a head addressing circuit and a selection circuit in the magnetic disk apparatus shown in FIG. 1.

A head addressing circuit 6 is responsive to a head address 17 from the host system for issuing a head selection signal 18 to select a single magnetic head. Where there are eight magnetic heads mounted in the magnetic disk apparatus, one magnetic head can be selected by a 3-bit head address. FIG. 2 illustrates the head addressing circuit 6 in detail. The head address 17 from the host system is temporarily stored in a head address register 61. A decoder 62 decodes the head address issued from the head address register 61 to produce a head selection signal 18 which specifies a sole magnetic head out of the eight magnetic heads.

The head selection signal 18 is fed to a selection circuit 7 and the read/write circuit 4. The read/write circuit 4 selects a single magnetic head in response to the head selection signal 18, as described above. The selection circuit 7 has a capability for establishing a peak shift for each magnetic head according to a feature of the present invention. FIG. 2 also shows the selection circuit 7 in detail. The head selection signal 18 is applied to inverters 711 through 718 which are associated with the magnetic heads 111 through 118, respectively. To the inverters 711 through 718, there are respectively connected switches 721 through 728 in series which issue signals through output terminals thereof as a timing switching signal 14 to the timing correction circuit 3. The switches 721 through 728 are closed or open at the time of manufacturing the magnetic disk apparatus such that the magnetic heads will suffer no characteristic variations taking into account frequency characteristics and the like of the magnetic heads. As will be described later on with reference to FIG. 4, for those magnetic heads which have a poor resolution Re ranging from 0.6 to 0.8 (that can be expressed as head readout output at a maximum write frequency/head readout output at a minimum write frequency), the corresponding switches are closed, and for those having a good resolution Re of 0.8 or higher, the corresponding switches are open. The process of closing and opening the switches 721 through 728 results in the selection of a delay time of writing data on the disk media in the timing correction circuit 3.

Figure 3:
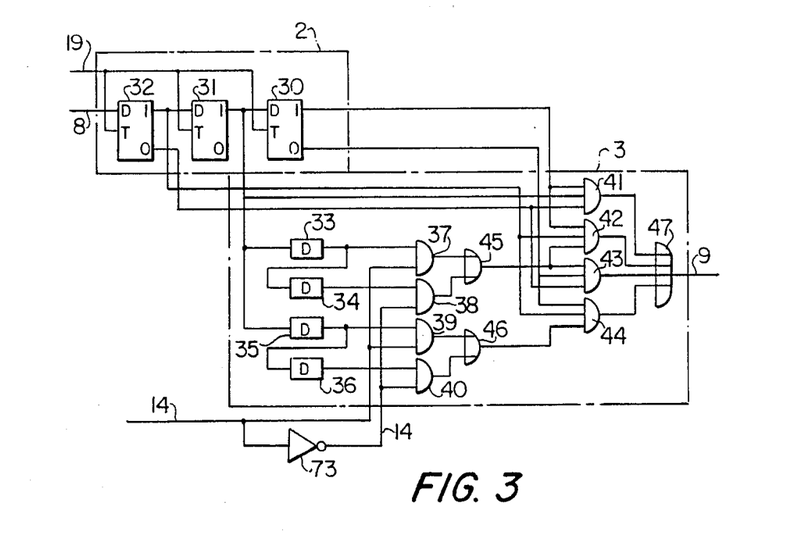
FIG. 3 is a block diagram of a timing correction circuit in the magnetic disk apparatus of FIG. 1.

The timing correction circuit 3 will hereinafter be described in detail with reference to FIG. 3. The shift register 2 comprises a plurality of series-connected flip-flops (hereinafter referred to as "FF") 30, 31, 32 having trigger terminals T to which a timing clock signal 19 of a fixed period is applied. The input write data signal 8 to be written on the disk medium is successively shifted in synchronism with the timing clock signal 19.

A "1" output terminal of the FF 32 is coupled to input terminals of AND gates 42, 44 in the timing correction circuit 3, and a "0" output terminal of the FF 32 is coupled to input terminals of AND gates 41, 43. The FF 31 has a "1" output terminal connected to input terminals of delay circuits 33, 35 and an input terminal of the AND gate 41. The FF 30 has a "1" output terminal connected to input terminals of the AND gates 41, 42 and a "0" output terminal to input terminals of the AND gates 43, 44. The delay circuit 33 has an output terminal connected to an input terminal of an AND gate 37 and, via a delay circuit 34, to an input terminal of an AND gate 38. The delay circuit 35 has an output terminal connected to an input terminal of an AND gate 39 and, via a delay circuit 36, to an input terminal of an AND gate 40. The ratio of the delay times of the delay circuits 33, 34 and the delay circuits 35, 36 is selected to be about 1:2, that is, the delay time of the delay circuits 33, 34 is selected to be 1.5 ns and the delay time of the delay circuits 35, 36 is selected to be 3 ns. The delay circuits 33, 34, 35, 36 serve as a unit for setting a delay time for data items to be written.

The timing switching signal 14 is applied from the selection circuit 7 to the AND gates 37, 39 and the timing switching signal 14 as inverted by an inverter 73 is applied to the AND gates 38 and 40. The AND gates 37, 38 have output terminals connected through an OR gate 45 to the input terminals of the AND gates 42, 43, and the AND gates 39, 40 have output terminals connected through an OR gate 46 to the input terminal of the AND gate 44. Therefore, the AND gates 37 through 40 serve as a unit for selecting a delay time by the switching signal 14. Outputs from the AND gates 41 through 44 are applied to an OR gate 47 which produces an output as the write data signal 9 to be written on the disk medium, the output from the OR gate 47 being applied to the read/write circuit 4. The group of AND gates 41 through 44 also serves as a unit for setting a shifting direction of the write data signal. The output from the AND gate 41 becomes effective when no pattern peak shift is to be made. The AND gates 42, 43 are selected when an ordinary pattern peak shift is to be effected, that is, for a straight line C1 shown in FIG. 4. The AND gate 44 is selected when the input write data signal is to be delayed, that is, for a straight line C2 shown in FIG. 4.

Operation of the timing correction circuit thus constructed will be described. Data 8 to be written in the disk medium is set in the FF 32 of the shift register in synchronism with the timing clock signal 19, and is shifted successively through the FFs 31, 30 by the timing clock signal 19. It is assumed here that the input write data, a "110", is set in the FFs 30, 31, 32 as shown in curve a, in FIG. 5. If the head address 17 for selecting the magnetic head 111 is given from the host system to the head addressing circuit 6, then the signal 18 for selecting the magnetic head 111 is applied to the read/write circuit 4. Since the switch 721 is open in the selection circuit 7, the timing switching signal 14 is "1" and applied to the AND gates 37, 39 of the timing correction circuit 3. The switching signal 14 of "0" as inverted by the inverter 73 is applied to the AND gates 38, 40. At this time, the AND gates 37, 39 are turned on and the AND gates 42, 43, 44 are turned off, so that only the AND gate 41 is turned on. Therefore, the data "110" shown as curve a in FIG. 5 is written as a corrected data signal 9 (curve b), which is not delayed, through the magnetic head 111 on the disk medium 121 according to the timing signal 19 (in a mode indicated by a straight line B in FIG. 4); it will be read as curve c.

When the magnetic head 112 is selected with the write data "110" remaining the same, the switching signal becomes "0" since the switch 722 is closed. Therefore, the AND gates 38, 40 are turned on and the only the AND gate 41 is turned on to cause the corrected data 9 (curve d), which is not delayed, to be written according to the timing signal 19; it will be read as curve e.

Since the input write data signal is not delayed as above mentioned, comparing with the mode which will be mentioned next, the above mode is so to speak, an early timing mode.

Figure 6:
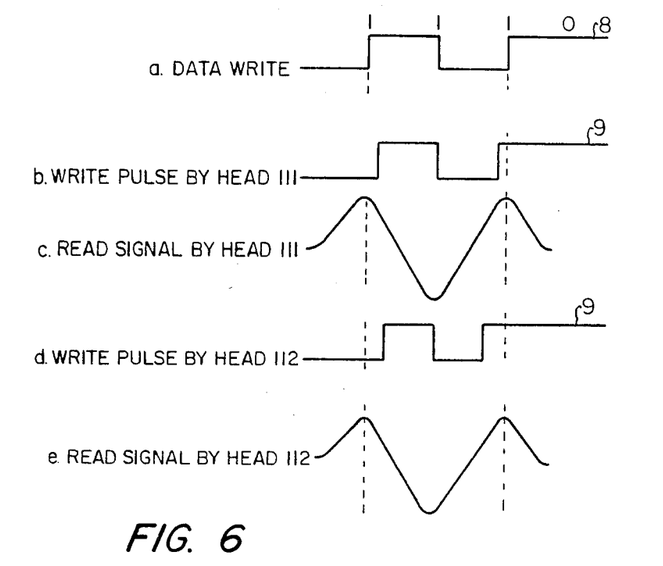

An example in which "111" is set as the write data 8 in the FFs 30, 31, 32 as shown in FIG. 6, curve a, will now be described.

When the magnetic head 112 is selected, the timing switching signal 14 is "0" and the AND gates 38, 40 are turned on. Thus, only the AND gate 42 is turned on, and the corrected data signal 9, curve d, is written through the magnetic head 111 on the disk medium in synchronism with the timing signal 19; corrected data is delayed by the delay circuits 33, 34 for 3 ns, for example. It will be read as curve e.

When the magnetic head 111 is selected with the write data "111" remaining unchanged, the timing switching signal 14 becomes "1" to turn on the AND gates 37, 39. At this time, only the AND gate 42 is turned on. However, the corrected data signal, curve b (FIG. 6) is written through the magnetic head 111 on the disk medium in synchronism with the timing signal 19; corrected data is delayed by the delay circuit 33 for 1.5 ns, for example. It will be read as curve c.

It will be understood from the foregoing that the corrected write data signal 9 varies from magnetic head to magnetic head even when the write data remains the same.

It is usually preferable that timing through the delays 33 and 34 be used as a normal timing mode.

Figure 7:
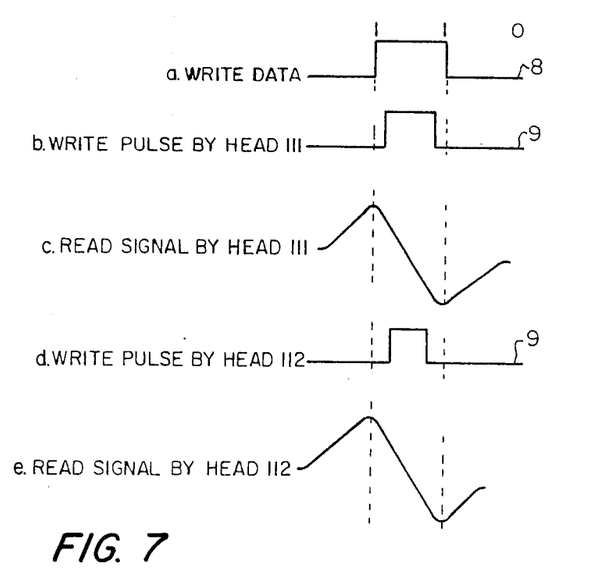

It is now assumed that the write data "011" is set in the FFs 30, 31, 32 as illustrated in FIG. 7 (curve a).

When the magnetic head 112 is selected, the AND gates 38, 40 are turned on and only the AND gate 44 is turned on. Therefore, the delay circuits 35, 36 produce a corrected write data signal 9 (curve d, FIG. 7, to produce read signal e) which is delayed for 6 ns, for example. When the magnetic head 111 is selected, the AND gates 37, 39 are turned on and only the AND gate 44 is turned on. Therefore, the delay circuit 35 produces a corrected write data signal 9 (curve b to produce read signal c), which is delayed for 3 ns, for example.

As compared with the normal mode, this timing is later than the normal mode.

As described above, different corrected write data signals 9 are produced according to whether the write data is "1" or "0" and according to the characteristics of the magnetic head, magnetic disk apparatus, or more broadly the characteristics of the read/write apparatus.

Figure 4:
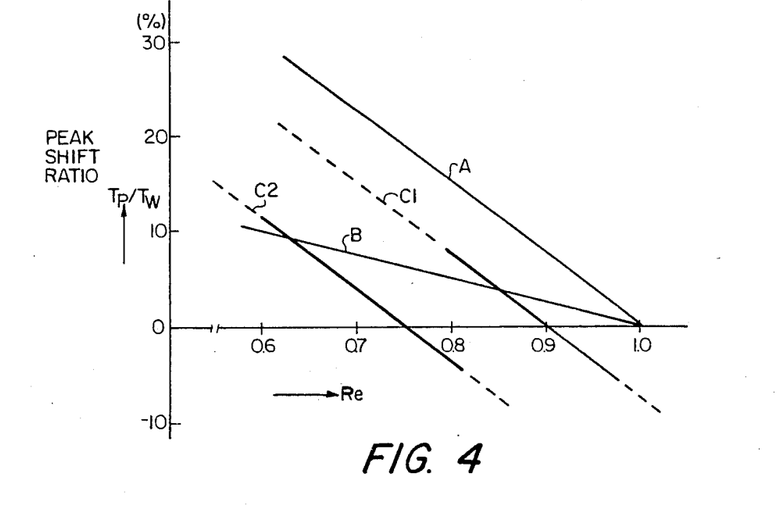
FIG. 4 is a diagram showing the relationship between resolution and a pattern peak shift.
Figure 5:
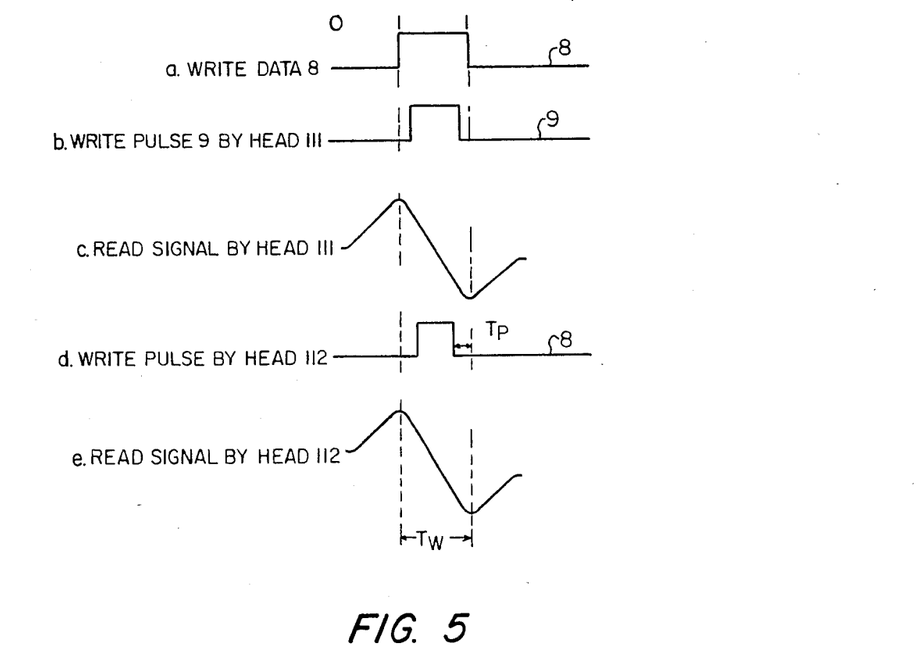
FIGS. 5, 6 and 7 are timing charts illustrative of the relationship between the written data and timing correction.

FIG. 4 is a diagram showing the relationship between the resolution Re and a pattern peak shift ratio. The resolution Re used herein is defined above, and the pattern peak shift ratio is a ratio of a peak shift Tp to a basic data width Tw. The line B is indicative of the example of FIG. 5 in which the write data has a small peak shift and no timing correction is effected. A straight line A is representative of an example in which the write data has a large peak shift. The data items shown in FIGS. 6 and 7 for example are corrected for timing so that the line C1 or C2 will be followed dependent on the magnetic head. Therefore, the timing is corrected from the characteristic curve A to the solid lines of the characteristic curves C1, C2 by the switching signal 14 set by the switches 721 through 728 and the timing correction circuit 3.

It will be understood that since the data items with their timing corrected are written on the disk media 121, 122, 123, the pattern peak shift can be reduced when reading the data items from the disk media.

Figure 8:
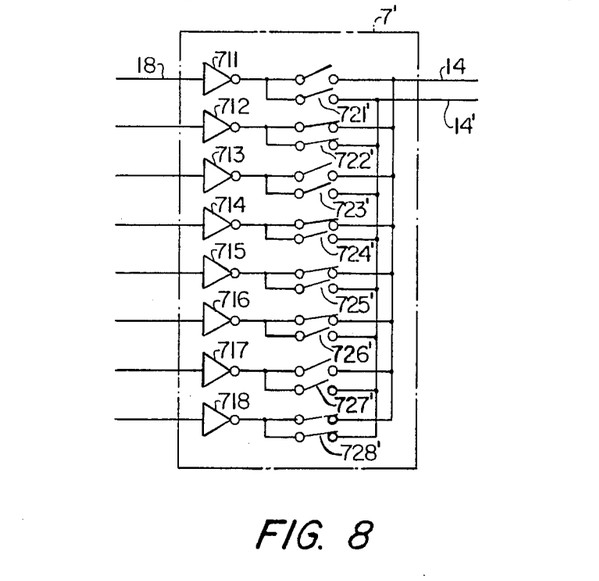
FIGS. 8 and 9 are block diagrams of a selection circuit and a timing correction circuit according to modifications of the present invention.
Figure 9:
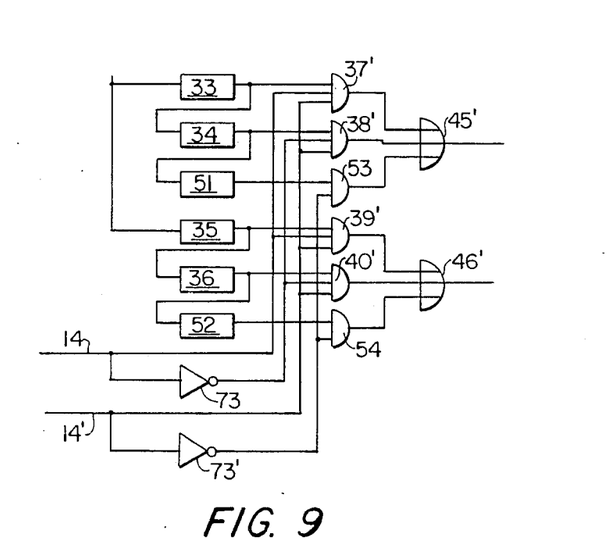

Although a certain embodiment of the present invention has been described, various changes and modifications can be made in the present invention. For example, the switches of the selection circuit 7, which have been illustrated as two-state switches, may comprise three-state switches or switches having more selectable states.

Where three-state switches are employed, a selection switch 7' includes additional switches 721' through 728' as shown in FIG. 8 to produce a switching signal 14'. As shown in FIG. 9, a partly modified timing correction circuit includes additional delay circuits 51, 52, an additional inverter 73', and additional AND gates 53, 54.

Magnetic disks generally have a higher recording density and a greater magnetic interference radially inwardly or toward the center, with the result that the peak shift becomes greater toward the center of the disk. According to the modification, switches 722, 724, 726 and 728 corresponding to the radially inward magnetic heads 112, 114, 116, 118 are closed, and switches 721, 723, 725, 727 corresponding to the radially outwardly magnetic heads 111, 113, 115, 117 are open to compensate for pattern peak shifts.

We claim:
1. An information recording apparatus, comprising:
means for supplying data to be recorded;
transducer means for performing operations of recording the data on information recording media;
means for selecting said transducer means;
means for establishing outputs to control timing of operations of said transducer means according to predetermined characteristics of individual elements of said transducer means, and for providing said output during selection of corresponding ones of said transducer means;
timing correction means for controlling timing of the operations according to said output; and
recording control means for supplying the data from said data supplying means to said transducer means according to the timing controlled by said timing correction means.

2. The information recording apparatus according to claim 1, wherein said timing correction means controls the timing according to the predetermined characteristic of said transducer means and the density of logical ONE states in the data supplied by said data supplying means.

3. The information recording apparatus according to claim 2, wherein said information recording media is a magnetic recording disk and said transducer means is a magnetic head.

4. The information recording apparatus according to claim 2, wherein the control of said timing by said timing correction means caused by said density of logical ONE states is varied according to the predetermined characteristic of said transducer means.

5. A magnetic recording apparatus, comprising:
   a. a magnetic recording medium;
   b. means for supplying digital data to be written on said magnetic recording medium;
   c. a plurality of magnetic head means for writing the data from said data supplying means on said magnetic recording medium;
   d. head selection means for selecting one out of said plurality of magnetic head means by which the data is written on said magnetic recording medium;
   e. means for setting a timing correction corresponding to a characteristic of each said magnetic head means and providing a signal indicating the characteristic of each magnetic head means selected by said head selection means;
   f. timing correction means for controlling the timing of writing the data according to the signal from said setting means; and
   g. control means for transferring the data from said data supplying means to said magnetic head means selected by said head selection means according to the timing controlled by said timing correction means.

6. The magnetic recording apparatus according to claim 5, wherein said head selection means selects one of said plurality of magnetic head means when data is written on and read from said magnetic recording medium, further comprising means for synchronizing the phase of the data read from said magnetic recording medium by said control means.

7. The magnetic recording apparatus according to claim 5, wherein said data supplying means includes a memory to temporarily store the data.

8. The magnetic recording apparatus according to claim 5, wherein said setting means includes means corresponding to each said magnetic head means for switching the timing correction between predetermined states corresponding to the characteristic of each said magnetic head means.

9. The magnetic recording apparatus according to claim 8, wherein said switching means corresponding to each said magnetic head means is set to a state which generates a value for each signal to regulate control of said timing correction means.

10. The magnetic recording apparatus according to claim 8, wherein said magnetic recording medium is a rotatable magnetic hard disk, further comprising an arm which is movable toward the center of rotation of said magnetic hard disk supporting a first inner one of said magnetic head means comparatively close to said center and a second outer one of said magnetic head means comparatively farther from said center than said first head; and further means to provide different timing delays for inner and outer ones of said head means.

11. The magnetic recording apparatus according to claim 5, wherein said timing correction means includes a plurality of different delay elements and means for seelcting said delay elements according to the signal from said setting means.

12. The magnetic recording apparatus according to claim 5, wherein said timing correction means controls the timing according to the signal from said setting means and the density of logical ONE states in the data transferred from said data supplying means.

13. The magnetic recording apparatus according to claim 12, wherein the control of the timing by said timing correction means caused by said density of logical ONE states is varied according to the signal from said setting means.

14. The magnetic recording apparatus according to claim 5, further comprising a plurality of delay elements and a signal line to transfer the data from said data supplying means to said delay elements, whereby said head selection means selects said delay elements according to the logical states of the data transferred over said signal line and state of the signal from said setting means.

15. A timing correction method in a magnetic recording apparatus, comprising the steps of:
   determining a pattern peak shift characteristic of a magnetic read/write head;
   making a comparison of the determined pattern peak shift with a reference range;
   selectively associating a timing delay with the magnetic read/write head according to said comparison; and
   recording digital data on a magnetic medium by the magnetic read/write head with the delay when the pattern peak shift ratio is substantially outside said range.

16. The timing correction method according to claim 15, further comprising the step of selectively associating said timing delay with the magnetic head according to said comparison and the density of logical ONE states of the data, so that the data will be recorded on a magnetic medium by the magnetic head with the delay when the pattern peak shift ratio is substantially outside the range and the density of logical ONE states is above a predetermined density.

17. The timing correction method according to claim 15, wherein said step of recording employs on the magnetic medium a rotatable magnetic hard disk and an arm which is movable toward the center of rotation of the magnetic hard disk supporting a first and inner magentic read/write head comparatively close to said center and a second and outer magnetic read/write head comparatively farther from said center than said first head so that both the first and second heads record on respective inner and outer annular portions of a single surface of the disk, further comprising the step of providing different data recording timing delays for the inner and outer heads.

18. The timing correction method according to claim 16, wherein said step of recording employs as the magnetic medium a rotatable magnetic hard disk and an arm which is movable toward the center of rotation of the magnetic hard disk supporting a first and inner magnetic read/write head comparatively close to said center and a second and outer magnetic read/write head comparatively farther from said center than said first head so that both the first and second heads record on respective inner and outer annular portions of a single surface of the disk; and further comprising the step of providing different data recording timing delays for the inner and outer heads.

19. A magnetic recording apparatus, comprising:
   a. a rotatable magnetic hard disk;
   b. a plurality of magnetic heads including a first inner one comparatively close to the center of rotation of said magnetic hard disk and a second outer one comparatively farther from said center than said first head;
   c. means to write and read digital data on and from inner and outer portions of one surface of said magnetic hard disk by said inner and outer heads, respectively,
   d. a memory to temporarily store the data to be written on said magnetic hard disk;
   e. means for selecting one out of said plurality of magnetic heads when the data is written on and read from said magnetic hard disk;
   f. means for causing a timing correction corresponding to a location of each said magnetic head and providing a signal indicating the characteristic caused by the location of each magnetic head;
   g. timing correction means including a plurality of different delay elements and gate means for selecting said delay elements according to the signal from said causing means and the density of logical ONE states in the data transferred from said memory to provide different timing delays for said inner and outer magnetic heads; and
   h. read/write means to transfer the data from said memory to said magnetic head selected by said selecting means according to the timing provided by said timing correction means.

20. An information recording apparatus, comprising:
means for supplying data to be recorded;
a plurality of transducer means for recording the data from said data supplying means on an information recording medium;
means for selecting one of said plurality of transducer means;
means for establishing timing corrections corresponding to characteristics of said plurality of transudcer means and for providing an output corresponding to a characteristic of each one of said plurality of transducer means selected by said selecting means;
timing correction means for controlling timing of the recording according to said output; and
recording control means for supplying the data from said data supplying means to said transducer means according to the timing controlled by said timing correction means.

21. The information recording apparatus according to claim 20, wherein said timing correction means controls the timing according to a predetermined characteristic of said transducer means and the density of logical ONE states in the data supplied by said data supplying means.

22. The information recording apparatus according to claim 21, wherein the control of said timing by said timing correction means caused by said density of logical ONE states is varied according to the predetermined characteristic of said transducer means.

23. An information recording apparatus, comrpising:
means for selecting one of a plurality of transducer means for recording data on an information recording medium;
means for establishing timing delays corresponding to characteristics of the plurality of transducer means and for providing an output indicating a corresponding characteristic of each one of the transducer means selected by said selecting means;
timing correction means for controlling timing of the recording according to said output; and
recording control means for supplying the data to said transducer means according to the timing controlled by said timing correction means.

24. The information recording apparatus according to claim 24, wherein said timing correction means controls the timing according to a predetermined characteristic of the transducer means and the density of logical ONE states in the data supplied by said data supplying means.

25. The information recording apparatus according to claim 24, wherein the control of said timing by said timing correction means caused by said density of logical ONE states is varied according to the predetermined characteristic of said transducer means.

26. An information recording apparatus, comprising:
means for selecting one of a plurality of transducer means for recording and reading data on information recording media;
means for selectively associating an output with each one of the plurality of transducer means according to characteristics of respective ones of the transducers, and for providing the corresponding said output during selection of each one of the transducer means by said selecting means;
timing correction means for controlling timing of the recording according to the output provided by said associating means; and
recording control means for supplying the data to the transducer means according to the timing controlled by said timing correction means.

27. The information recording apparatus according to claim 26, wherein said timing correction means controls the timing according to a predetermined characteristic of the transducer means and the density of logical ONE states in the data supplied by said data supplying means.

28. The information recording apparatus according to claim 26, wherein the control of said timing by said timing correction means caused by said density of logical ONE states is varied according to the predetermined characteristic of said transducer means.

29. A magnetic recording apparatus, comprising:
magnetic head means including a plurality of transducer means, for writing data on magnetic recording media;
head selection means for selecting one of said transducer means to write the data on said magnetic recording media;
means for setting timing corrections corresponding to a characteristic of each said transducer means and providing a signal indicating the characeristic of each transducer means selected by said head selection means;
timing correction means for controlling the timing for writing the data according to the signal from said setting means; and
control means for transferring the data to said magnetic head means selected by said head selection means according to the timing controlled by said timing correction means.

30. The magnetic recording apparatus according to claim 29, wherein said head selection means selects one of said plurality of magnetic head means when data is written on and read from said magnetic recording medium, further comprising means for synchronizing the phase of the data read from said magnetic recording medium by said control means.

31. The magnetic recording apparatus according to claim 29, wherein said setting means includes means corresponding to each said magnetic head means for switching the timing correction between predetermined states corresponding to the characteristic of each said magnetic head means.

32. The magnetic recording apparatus according to claim 31, wherein said switching means corresponding to each said magnetic head means is set to a state which generates a value for each signal to regulate control of said timing correction means.

33. The magnetic recording apparatus according to claim 29, wherein said timing correction means controls the timing according to the signal from said setting means and the density of logical ONE states in the data transferred from said data supplying means.

34. The magnetic recording apparatus according to claim 29, further comprising a pluraltiy of delay elements and a signal line to transfer the data to said delay elements, whereby said head selection means selects said delay elements according to the logical states of the data transferred over said signal line and state of the signal from said setting means.

35. A magnetic recording apparatus, comprising:
a plurality of magnetic head means for writing data on magnetic recording media;
head selection means for selecting one of said plurarity of magnetic head means to write the data on said magentic recording media;
means for setting timing corrections corresponding to characteristics of each of said magnetic head means and providing a signal indicating the characteristic of each magnetic head means selected by said head selection means;
timing correction means for controlling the timing for writing the data according to the signal from said setting means; and
control means for transferring the data to said magnetic head means selected by said head selection means according to the timing controlled by said timing correction means.

36. The magnetic recording apparatus according to claim 35, wherein said head selection means selects one of said plurality of magnetic head means when data is written on and read from said magnetic recording medium, further comprising means for synchronizing the phase of the data read from said magnetic recording medium by said control means.

37. The magnetic recording apparatus according to claim 35, wherein said setting means includes means corresponding to each said magnetic head means for switching the timing correction between predetermined states corresponding to the characteristic of each of said magnetic head means.

38. The magnetic recording apparatus according to claim 37, wherein said switching means corresponding to each said magnetic head means is set to a state which generates a value for each signal to regulate control of said timing correction means.

39. The magnetic recording apparatus according to claim 35, wherein said timing correction means controls the timing according to the signal from said setting means and the density of logical ONE states in the data transferred from said data supplying means.

40. The magnetic recording apparatus according to claim 35, further comprising a plurality of delay elements and a signal line to transfer the data to said delay elements, whereby said head selection means seelcts said delay elements according to the logical states of the data transferred over said signal line and state of the signal from said setting means.

41. A magnetic recording apparatus, comprising:
a plurality of magnetic head means for performing operations of writing data on magnetic recording media;
head selection means for selecting one of said plurality of magnetic head means to perform operations with the data on said magnetic recording media;
means for setting an output indicating a resolution characteristic of each magnetic head means and for providing a corresponding output for each one of said magnetic head means selected by said head selection means;
timing correction means for controlling the timing for operations of the magnetic head means for writing and reading the data, according to the output from said setting means; and
control means for transferring the data to said magnetic head means selected by said head selection means according to the timing controlled by said timing correction means.

42. The magnetic recording apparatus according to claim 41, wherein said head selection means selects one of said plurality of magnetic head means when data is written on and read from said magnetic recording medium, further comprising means for synchronizing the phase of the data read from said magnetic recording medium by said control means.

43. The magnetic recording apparatus according to claim 41, wherein said setting means includes means corresponding to each said magnetic head means for switching the timing correction between predetermined states corresponding to the characteristic of each said magnetic head means.

44. The magnetic recording apparatus according to claim 43, wherein said switching means corresponding to each said magnetic head means is set to a state which generates a value for each signal to regulate control of said timing correction means.

45. The magnetic recording apparatus according to claim 41, wherein said timing correction means controls the timing according to the signal from said setting means and the density of logical ONE states in the data transferred from said data supplying means.

46. The magnetic recording apparatus according to claim 41, further comprising a plurality of delay elements and a signal line to transfer the data to said delay elements, whereby said head selection means selects said delay elements according to the logical states of the data transferred over said signal line and state of the signal from said setting means.

* * * * *